United States Patent [19]
Glenn

[11] 3,888,196
[45] June 10, 1975

[54] DISPENSING AND HOOD ASSEMBLY FOR ROTARY TILLER

[76] Inventor: William E. Glenn, R.F.D. #2, Carlton, Ga. 30627

[22] Filed: Jan. 31, 1974

[21] Appl. No.: 438,257

[52] U.S. Cl. .................. 111/10; 172/42; 172/60; 172/112
[51] Int. Cl. ........................................... A01c 7/08
[58] Field of Search .......... 111/10, 6, 7; 172/42, 43, 172/60, 112, 123, 81, 507, 509, 512, 514, 517

[56] References Cited
UNITED STATES PATENTS

| | | | |
|---|---|---|---|
| 2,220,342 | 11/1940 | Maga | 172/42 X |
| 2,574,237 | 11/1951 | Barrow | 172/42 |
| 3,202,221 | 8/1965 | Monk | 172/60 X |
| 3,347,188 | 10/1967 | Richey | 172/112 X |
| 3,604,515 | 9/1971 | Kipping | 172/60 |

FOREIGN PATENTS OR APPLICATIONS

| | | | |
|---|---|---|---|
| 110,455 | 1/1965 | Netherlands | 120/43 |

Primary Examiner—Stephen C. Pellegrino
Attorney, Agent, or Firm—Jones, Thomas & Askew

[57] ABSTRACT

A hood for a domestic rotary tiller, and a dispensing means for dispensing material into the confines of the hood, the hood having a forward lip to sweep aside debris that may be in front of the tiller and defining an incorporation chamber into which material is dispensed for incorporation into the soil, the hood also acting as a crop shield for runner- and vine-type growing plants.

6 Claims, 4 Drawing Figures

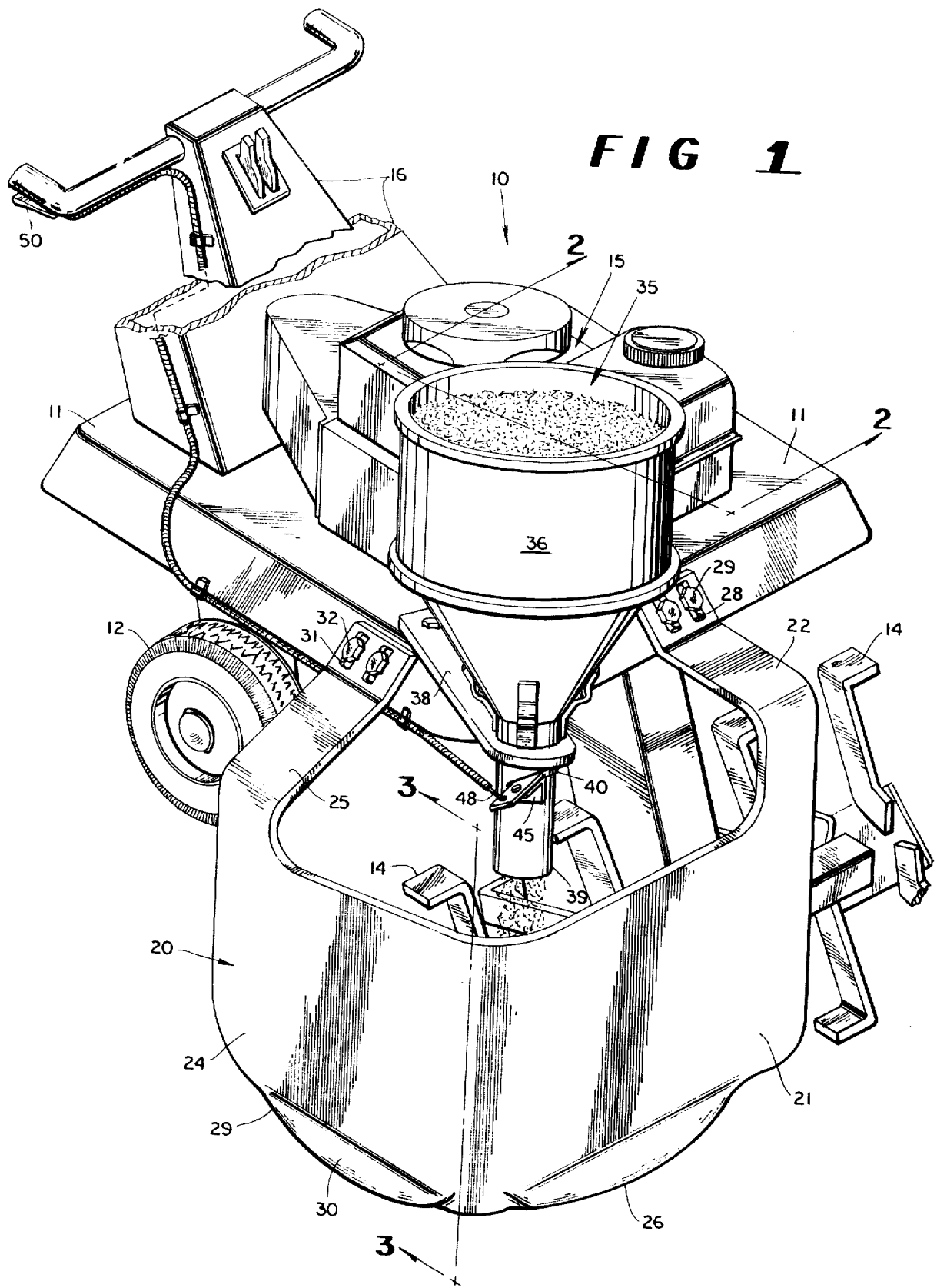

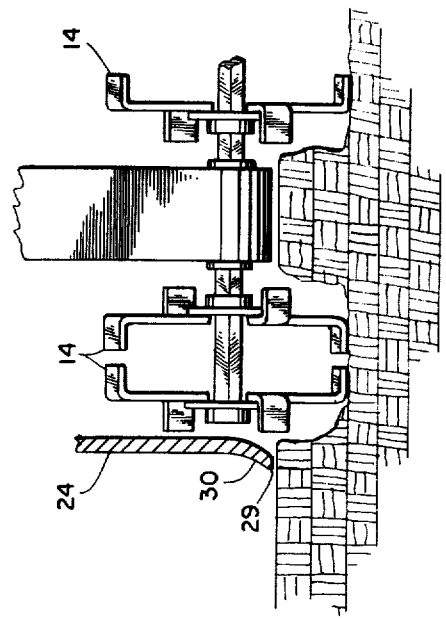
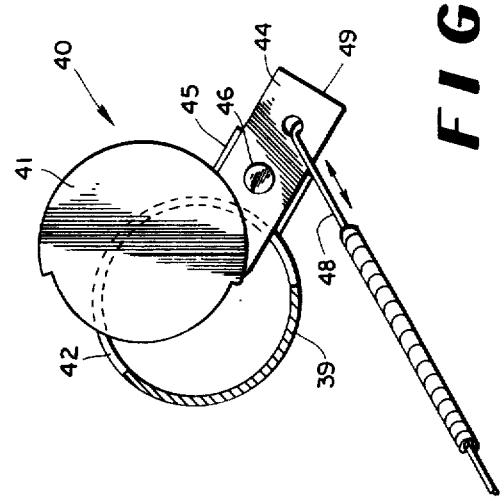
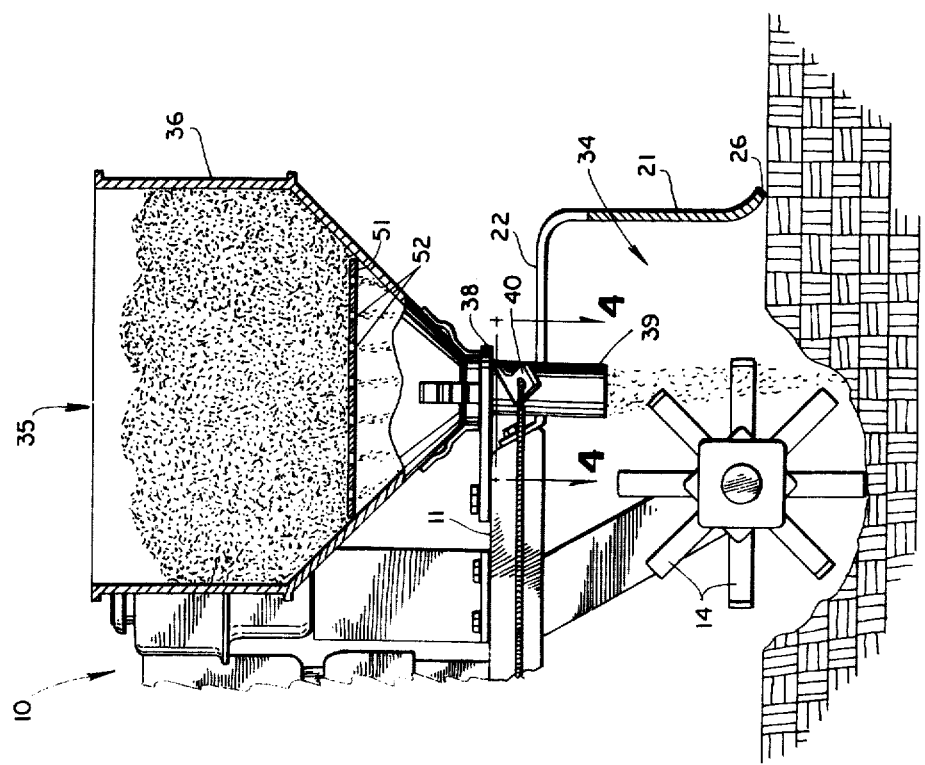

DISPENSING AND HOOD ASSEMBLY FOR ROTARY TILLER

This invention relates to rotary tillers, and is more particularly concerned with a hood assembly in conjunction with a dispensing apparatus for use with rotary tillers.

Domestic rotary tillers have achieved a wide acceptance on the market, and are used very generally for soil preparation in small gardens, lawns, etc. However, while the conventional rotary tiller will accomplish the basic job of spading land for initial soil preparation, the conventional domestic rotary tiller is ill-adapted for the more sophisticated jobs of thorough soil pulverisation, incorporation, and the like. Also, the conventional rotary tiller has the disadvantage in initial soil preparation in that various sticks, rocks and other debris will be engaged by the rotary spade members which may dull the spade members, in addition to the hazard of the spades' throwing sticks and the like. It is also an undesirable possibility that the stones and like debris will be turned into the soil by the rotary tiller. Furthermore, the conventional rotary tiller has no crop shield or other protective means, so that it is difficult to use a conventional rotary tiller to cultivate growing crops without severely damaging the growing crops.

The apparatus of the present invention overcomes the above-mentioned and other difficulties with the prior art conventional rotary tiller by providing a hood for at least a portion of the spade members of the rotary tiller, the hood having means to prevent the entrance thereinto of debris lying on the unprepared land, and the hood is so located as to function as a crop shield. The hood further functions as an enclosure to contain the spaded soil so that the soil can be thoroughly pulverised; and, in the course of such pulverisation, various chemicals can be incorporated into the soil through the use of a dispenser mounted in conjunction with the hood.

These and other features and advantages of the present invention will become apparent from consideration of the following specification when taken in conjunction with the accompanying drawings in which:

FIG. 1 is a perspective view of apparatus made in accordance with the present invention and mounted on a conventional rotary tiller;

FIG. 2 is a cross-sectional view taken substantially along the line 2—2 in FIG. 1;

FIG. 3 is a cross-sectional view taken substantially along the line 3—3 in FIG. 1; and FIG. 4 is a cross-sectional view taken substantially along the line 4—4 in FIG. 2.

Referring now more particularly to the drawings and to that particular embodiment of the invention here chosen by way of illustration, it will be seen that the tiller 10 includes a platform 11 having a pair of wheels 12 at the rear thereof, and a plurality of rotatable spade members 14. A motor 15 is mounted on the platform 11 and appropriately connected to the axle on which the spade members 14 are mounted for driving the spade members 14. The drive arrangement forms no part of the present invention and is not here illustrated. The upper rear portion of the platform 11 mounts a handle 16 for control to the tiller 10 by the user.

Referring now to FIGS. 1 and 2 of the drawings, it will be seen that the spade members 14 are partially surrounded by a hood generally designated at 20. The hood 20 includes a front wall 21 having a supporting strap 22 extending therefrom upwardly and rearwardly to connect to the platform 11. Substantially at right angles to the front wall 21, there is a side wall 24 formed integrally with the front wall 21, the side wall 24 having a supporting strap 25 extending upwardly, then inwardly towards the platform 11.

In more detail, the front wall 21 is substantially rectangular in front elevation with the lowermost edge thereof turned forward as at 26. This forwardly turned edge, or lip, 26 is always adjusted to be closely adjacent to the ground as best shown in FIG. 2 so that sticks, stones, weeds and other debris will be moved ahead of the hood 20 and will not get inside the hood 20 to be engaged by the spade members 14. Sticks, stones and the like can otherwise dull the spade members, and weeds can become entangled in them.

To render the front wall 21 adjustable in order to locate the lip 26 close to the ground at all times, the supporting strap 22 is provided with elongated slots 28 that receive screws 29 therethrough. The screws 29 fix the strap 22 to the platform 11; and, because of the elongated slots 28, the strap 22 can be vertically adjusted to vary the height with respect to the platform 11, thereby varying the height of the front wall 21 with respect to the platform 11.

The side wall 24 is similar to the front wall 21, but the lowermost edge is sloped upwardly towards the rear of the wall 24 for reasons to be discussed more fully hereinafter. The lowermost edge 29 of the side wall 24 is turned outwardly as best shown in FIG. 3 of the drawings. This outward turning provides a flange 30 to prevent damage to the hood 20 in the event the edge 29 is inadvertently engaged by the spade members 14, in that the side wall 24 will be urged out rather than up by the impact of a spade member 14.

To allow vertical adjustment of the side wall 24, the strap 25 is provided with elongated slots 31 similar to the slots 28. Screws or the like 32 engage the platform 11, passing through the slots 31; therefore, the strap 25 can be moved relative to the platform 11 to the full extent of the elongated slots 31.

It will now be seen that a partial enclosure has been formed around the spade members 14; and, while the hood 20 has certain advantages when used alone, the hood 20 has the additional advantage of providing a mixing, or incorporation, chamber for the incorporation of various chemicals into the soil. In order to utilize this incorporation chamber 34, a dispenser generally designated at 35 is carried by the tiller 10.

The dispenser 35 is best shown in FIGS. 1 and 2 of the drawings, and includes a hopper 36 supported on a plate 38, the plate 38 being fixed to the platform 11 of the tiller 10. The hopper 36 communicates with a spout 39 to direct material from the hopper 36 to the appropriate location within the incorporation chamber 34, and a valve 40 is interposed within the spout 39.

The valve 40 is more clearly shown in FIG. 4 of the drawings and includes a valve plate 41 of substantially circular configuration and having approximately the same diameter as the diameter of the spout 39. A circumferential slit 42 within the side wall of the spout 39 provides for sliding motion of the valve plate 41 into and out of the spout 39. The valve plate 41 has an operating tab 44 extending therefrom, the tab 44 being pivotally mounted on the spout 39 by a bracket 45 which receives the pivot pin 46.

To operate the valve 40, a bowden wire 48 is fixed to the outermost end 49 of the operating tab 44. The bowden wire 48 then extends rearwardly, up the handle 16 and terminates in an operating lever 50 conveniently placed for operation by the user. It will thus be seen that manipulation of the operating lever 50 will act through the bowden wire 48 to move the operating tab 44 and cause the valve plate 41 to move about the pivot 46.

If the hopper 36 is filled with a material to be dispensed, the weight borne by the valve plate 41 could make the valve 40 difficult to operate. To prevent this difficulty, a perforate plate 51 is disposed within the hopper 36 substantially perpendicularly to the direction of flow of material. The plate 51 is fixed to the walls of the hopper 36, and includes a plurality of apertures 52 therethrough.

With this arrangement it will be seen that the solid portions of the plate 51 will bear a large part of the weight of the material above the plate 51, thereby removing the weight from the valve 40. It will readily be seen that the perforate plate 51 could be interchangeable so that apertures 52 of various sizes could be used depending on the grain size of the material contained in the hopper 36.

Having considered the general construction of the apparatus of the present invention, the operation will now be discussed.

First, the hood 20 should be mounted on the platform 11 of the rotary tiller 10. It is contemplated that, in initial soil preparation, the hood 20 will traverse the portion of the ground that has not been tilled; and, though the hood 20 is here illustrated as being on the right side of the tiller 10 as viewed by a user, it is equally within the scope of the present invention to reverse the hood 20 and mount the hood 20 on the left side of the tiller 10.

Next, the depth of cultivation should be determined, and the hood 20 adjusted accordingly. As previously stated, the lip 26 on the front wall 21 should be closely adjacent to the ground in order to sweep away various debris; therefore, the hood 20 should be adjusted vertically by use of the elongated slots 28 so that, when the spade members 14 are penetrating to the desired depth, the lip 26 will be close enough to the ground to sweep aside the debris in front of the tiller. Since the front wall 21 and the side wall 24 are formed integrally, the supporting strap 25 will be similarly adjusted using the elongated slots 31 to vary the height of the side wall 24 with respect to the platform 11.

During the first ground breaking, it is likely that there will be a considerable amount of debris on the ground, and during this work the lip 26 is quite useful. Also during the initial ground breaking it is possible that a herbicide will be mixed with the soil to control the unwanted plant growth. Thus, a granular herbicide can be placed within the hopper 36, and the valve 40 can be opened to dispense the desired amount of herbicide.

With the above described arrangement, the unbroken ground should always be kept towards the right of the user, since the hood 20 with the lip 26 is on the right. Further, only about half of the spade members 14 will be digging new ground; the other half of the spade members 14 will be operating in previously tilled ground to achieve better mixing of chemical and greater pulverisation of the soil. It will be observed from FIG. 2 that the spout 39 directs the material from the hopper 36 to the point approximately where the spade members 14 enter the ground, and closely adjacent to the side wall 24. With such an arrangement better incorporation of the chemical into the soil is assured; and, since the chemical is dispensed adjacent to the side wall 24, it will also be adjacent to growing crops for application close to the roots of crops.

After the initial spading or tilling of the soil it is desirable to make one or more additional passes through the soil for better pulverisation of the soil; and at this move fertilizers, pesticides and the like can be incorporated into the soil. For this operation it is usually desirable to work the soil rather shallowly and to allow the tiller 10 to more slowly over the ground while operating the spade members 14 at a rather high speed. For this operation the hood 20 will normally be lowered to be close to the ground even though the spade members 14 ride high in the ground.

The hood 20 now provides an incorporation chamber which is needed since the high speed spade members 14 will tend to throw the soil. By enclosing the soil while dispensing material from the hopper 36, the soil is thoroughly pulverised and intimately mixed with the chemicals.

When the spade members 14 are penetrating the soil to only a small extent, the tiller 10 tends to be tilted rearwardly somewhat because of the fixed height of the wheels 12. The lower edge 29 of the side wall 24 is shaped to allow this tilting. The upwardly sloped edge 29 is sufficient to prevent the side wall 24 from dragging the ground when the tiller 10 is tilted.

Since the hood 20 protects both a part of the front of the rotary tiller 10 and one side of the rotary tiller 10, the hood 20 is admirably suited as a crop shield to allow tilling very close to growing crops.

When crops are growing, it is of course necessary to till the ground periodically to loosen the soil, to remove weeds, and to add fertilizer and other chemicals to the soil. Such tillage is most effective if the soil very close to the roots of the growing crop is tilled and mixed with the necessary chemicals. However, the conventional rotary tiller is difficult to control to prevent damage to growing crops, and especially so if the growing crops are runner- or vine-type crops.

With the apparatus of the present invention, runner- or vine-type crops are urged aside by the lip 26 of the hood 20 so that the crop will not be damaged; and, stalk-type crops such as corn, brussels sprouts, peppers and the like are protected by the total hood 20 formed by the front wall 21 and the side wall 24. Thus, the hood 20 protects the growing crop, and allows chemical to be dispensed closely adjacent to the crop for maximum utilization of the chemical.

It will thus be seen that the apparatus of the present invention provides a simple attachment for a domestic rotary tiller that gives the tiller great versatility and renders cultivation of small plots very simple, from initial ground breaking to final soil working and incorporation, and tilling around growing crops. It will of course be understood that the particular embodiment of the invention here chosen is by way of illustration only, and numerous changes and modifications may be made, and the full use of equivalents resorted to without departing from the scope of the invention as defined by the appended claims.

What is claimed is:

1. A dispensing and hood assembly, for a rotary tiller including a platform, a plurality of spade members mounted for rotation with an axle, means for rotating the axle, and a handle for control of the tiller, including a front wall mounted from said platform forwardly of said spade members and substantially parallel to said axle, said front wall defining a forwardly turned lip at the lowermost edge thereof, a side wall disposed at one end of said axle and substantially at right angles with respect to said front wall, said front wall and said side wall being substantially vertically diposed and defining an incorporation chamber, and dispensing means carried by said rotary tiller generally above said incorporation chamber for dispensing material into said incorporation chamber.

2. A dispensing and hood assembly according to claim 1, said side wall having an outwardly turned flange at the lowermost edge thereof, and means for supporting said side wall from said platform.

3. A dispensing and hood assembly according to claim 1, said dispensing means comprising a hopper carried by said platform, a spout in communication with said hopper and adjacent to said incorporation chamber, and valve means within said spout for selectively opening and closing said spout.

4. A dispensing and hood assembly according to claim 3, said hopper including a weight bearing plate disposed substantially perpendicularly to the direction of material flow from said hopper and adjacent to said spout, said weight bearing plate being perforate to allow material to flow therethrough towards said spout.

5. A dispensing and hood assembly according to claim 2, and including variable support means for varying the height of said front wall and said side wall with respect to said platform.

6. A dispensing and hood assembly according to claim 4, and including a cable fixed to said valve for operating said valve remotely of said valve.

* * * * *